A. K. PEHRSON.
HAND BRAKE MECHANISM.
APPLICATION FILED JULY 31, 1917.
1,286,762.
Patented Dec. 3, 1918.
2 SHEETS—SHEET 2.
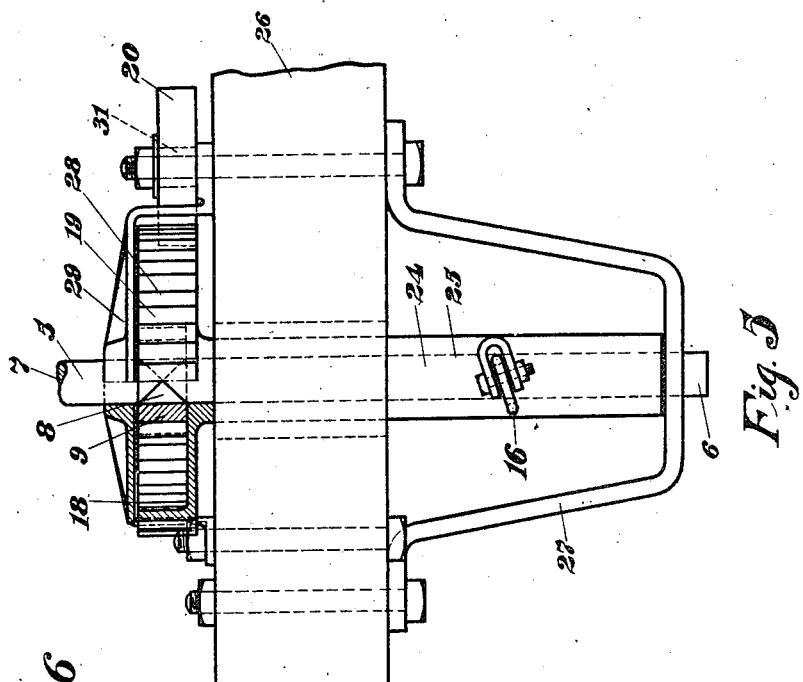
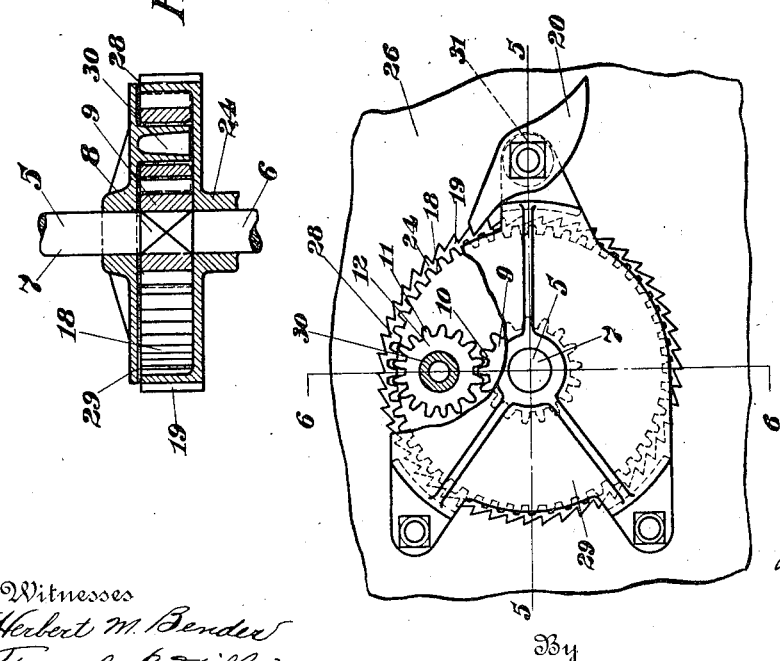

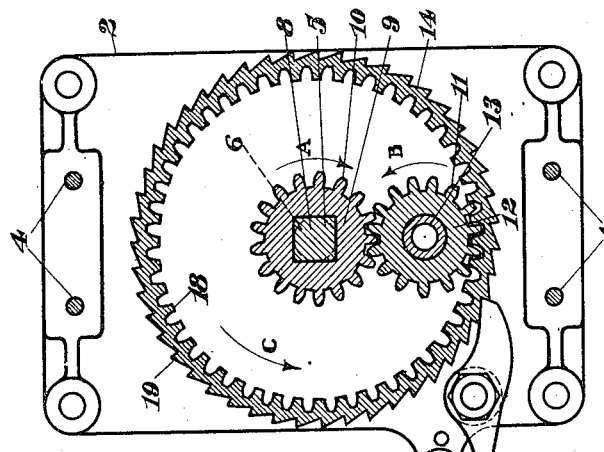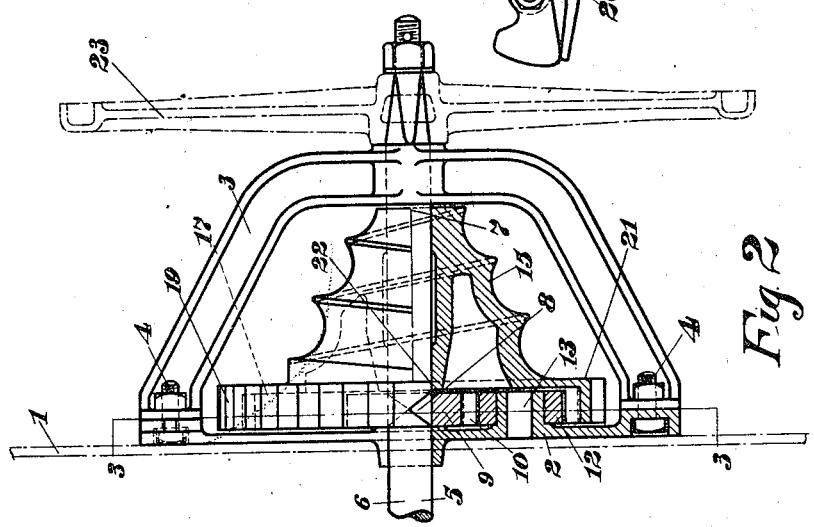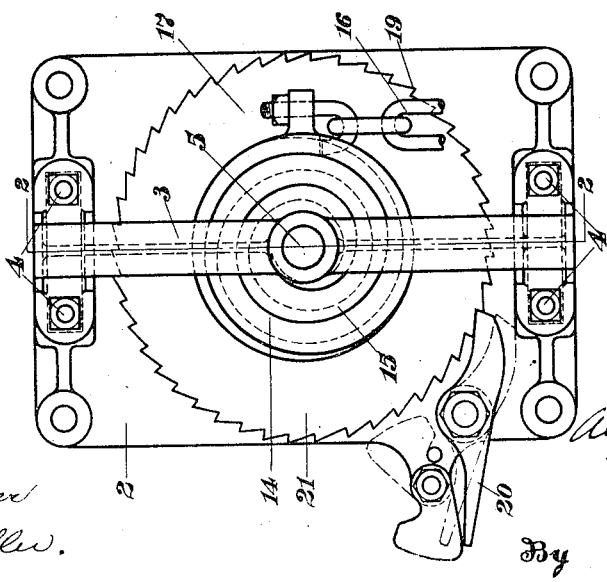

UNITED STATES PATENT OFFICE.

ALFRED K. PEHRSON, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

HAND BRAKE MECHANISM.

1,286,762.  Specification of Letters Patent.  Patented Dec. 3, 1918.

Application filed July 31, 1917. Serial No. 183,648.

*To all whom it may concern:*

Be it known that I, ALFRED K. PEHRSON, a subject of the King of Sweden, residing in Pittsburgh, in the county of Allegheny and State of Pennsylvania, have invented certain new and useful Improvements in Hand Brake Mechanism, of which the following is a specification.

This invention relates to railway car brakes, and has for its object to provide a geared brake mechanism which will be durable, simple in construction and operation, cheap to manufacture and easy to assemble and apply to a car.

Another object of the invention is to provide a brake mechanism for railway cars, in which the several parts comprising the mechanism are held securely together without the use of cotters, keys or other similar devices.

Another object of the invention is to provide a geared brake mechanism in which the gears thereof will be inclosed by other parts of the mechanism where they will be protected against damage.

These and other objects will be apparent from the following description.

Referring to the drawings, in which like reference characters refer to like parts, Figure 1 is an end view of the mechanism; Fig. 2 is a composite view of the same, the bottom half being a sectional view taken on the line 2—2 of Fig. 1, and the top half being a side view, and Fig. 3 is a sectional view of the mechanism taken on the line 3—3 of Fig. 2. Fig. 4 is a top view of a modification of the invention, portions of the top plate being removed to show the mechanism more clearly. Fig. 5 is a composite view of the same, the left hand half being a sectional view taken on the line 5—5 of Fig. 4 and the right hand half being an elevational view, and Fig. 6 is a sectional view taken on the line 6—6 of Fig. 4.

Referring now in detail to the drawings, 1 indicates the end wall of a car, and 2 a plate which is secured to such end wall by rivets or any other suitable means. 3 indicates a yoke member which at its ends is secured to the plate 2 by bolts 4 or any other suitable means. 5 indicates the brake shaft, the end portions 6 and 7 of which are round in cross section, and are journaled in the plate 2 and the yoke 3 respectively. Between the portions 6 and 7 this shaft is provided with an enlarged portion 8 which is preferably square in cross section, such portion having mounted thereon a gear wheel 9, the teeth 10 of which are adapted to mesh with teeth 11 of a pinion 12, which pinion is rotatably mounted on a projection 13 preferably integral with the plate 2. It will here be noted that instead of the projection 13 being made integral with the plate 2 it may be made separate therefrom in the form of a bolt or a member separate from the plate 2.

14 indicates a chain winding drum, which is loosely mounted on the portion 7 of the brake shaft. This drum is provided adjacent one end portion with a spirally grooved portion 15 upon which the chain 16 is adapted to be wound, and at its opposite end is provided with an enlarged portion 17, which has internal teeth 18 that mesh with the teeth 11 of the pinion 12, and has external teeth 19, with which a pawl 20, pivotally mounted on the plate 2, is adapted to engage. The enlarged portion 17 of the drum, as indicated at 21, is made to extend over a portion of the pinion 12, and is adapted to prevent such pinion from moving from its proper position on the projection 13, the drum itself being held against excessive outward longitudinal movement by its engagement with the yoke 3.

By making the portions 6 and 7 of the shaft round in cross section and by enlarging and making the portion 8 square in cross section, shoulders will be formed at both ends of the portion 8, which shoulders at one end are adapted to engage the plate 2, and when in such engagement will prevent excessive inward longitudinal movement of the shaft. At the opposite end of the portion 8 the shoulders are adapted to engage the portion 22 of the drum 14, and when in such engagement will prevent excessive outward longitudinal movement of the shaft. The portion 22 of the drum 14 extends over a portion of the gear wheel 9 and is adapted to prevent such gear wheel from moving from its proper operative position on the portion 8 of the shaft.

In Figs. 1 to 3 inclusive of the drawings, the mechanism has been shown applied to a stub end passenger car and in this embodiment of the invention the brake shaft has been shown extending through the end wall of the car, such shaft being provided at each end with a hand wheel 23 or any suitable lever, one wheel only being shown in the drawings. It is not essential that the shaft extend through the end wall of the car and be provided with a hand wheel at both ends, for it will be understood that the end portion 6 of the shaft may be shortened so that it will terminate short of the end wall, such portion being of sufficient length that it may be journaled in the plate 2, in which arrangement only one hand wheel or lever is necessary.

To apply the brakes the operation of the mechanism is as follows: the operator by the use of the hand wheel 23 rotates the shaft 5 and gear wheel 9 in the direction as indicated by the arrow A in Fig. 3, which causes the pinion 12, through its engagement with the gear wheel 9, to rotate in the direction as indicated by the arrow B in Fig. 3, which pinion through its engagement with the drum 14 will rotate such drum in the direction as indicated by the arrow C in Fig. 3, thus winding the chain 16 upon the drum 14. While the drum is being rotated in this direction the pawl 20 will engage the teeth 19 of the drum and prevent accidental reverse motion of the mechanism. To release the brakes, the pawl 20 is held out of engagement with the teeth 19, thus permitting the mechanism to operate in the reverse manner to that just described.

In Figs. 4 to 6 inclusive a modification of the invention has been illustrated, in which the brake shaft is vertically disposed. In this arrangement a drum 24 is provided having a chain winding portion 25 which may pass through the end sill or floor 26 of the car, and at its lower end preferably rests a yoke 27 which is secured to any suitable part of the car. This drum is also provided with an enlarged upper portion 28 which is preferably hollow in form and is provided with internal teeth 18 and external teeth 19.

The lower portion 6 of the brake shaft 5 passes through the drum 24 and at its lower end is suitably journaled in the yoke 27. The square portion 8 of this shaft is provided with a gear wheel 9 and the upper portion 7 of the shaft is provided with a hand wheel (not shown).

29 indicates a plate which is preferably secured to the end sill or the floor of the car and which extends over the enlarged portion 28 of the drum 24 and forms a bearing for the portion 7 of the shaft 5. This plate is provided with a downwardly depending projection 30 on which a pinion 12 is rotatably mounted, the teeth 11 of such pinion engaging with the teeth 10 of the gear wheel 9 and the teeth 18 of the drum 24. By extending over the drum 24 this plate prevents excessive upward vertical movement of the drum, while the yoke 27 prevents excessive downward vertical movement of the drum. The shaft 5 is held against excessive longitudinal vertical movement by the shoulders, at the ends of the square portion 8 engaging the plate 29 and drum 24.

To prevent reverse motion of the mechanism when the brakes are being applied, a pawl 20 is provided which may be mounted on a projection 31 preferably integral with the plate 29, such pawl being adapted to engage with the teeth 19 of the drum 24.

It will be noted from the foregoing description that the several parts comprising the mechanism shown in the drawings are so formed to coöperate with each other in such a manner that they may be held in operative positions without the use of keys, cotters or similar devices. In Figs. 1 to 3 inclusive the parts are held together between and by the plate 2 and the yoke 3, and in Figs. 4 to 6 inclusive the parts are held together between and by the plate 29 and yoke 27.

The mechanisms herein described comprise power increasing devices by means of which the power applied to the brake wheel is multiplied and the pull on the brake chain is increased over that which would be obtained should the mechanism between the brake mast and the drum be omitted. In this power increasing device I do not wish to be limited to one pinion between the gear wheel 9 and the chain winding drum, for it will be apparent to those skilled in the art that more than one pinion may be used for the purpose of multiplying the power applied to the brake wheels.

The internal and external teeth 18 and 19 respectively of the winding drum are so arranged relative to each other that the metal forming the two sets of teeth is substantially uniform in thickness, thus producing a casting of minimum weight and of a character which will permit even cooling of the metal throughout its rim, thus reducing the liability to distortion or cracking when cooling.

It is to be understood that the invention is not limited to the exact construction and arrangement of the parts as shown and described, for it will be apparent to those skilled in the art to which this invention pertains that many changes may be made without departing from the spirit and scope of the appended claims.

What I claim as new and desire to secure by Letters Patent is:

1. In a hand brake mechanism, a rotatable brake shaft, a bearing for said shaft, a winding drum mounted to rotate on said shaft, means for rotating said drum, means for preventing said drum from moving longitudinally on said shaft, and an enlarged portion on said shaft adapted to engage said bearing and drum to prevent said shaft from moving longitudinally.

2. In a hand brake mechanism, a base plate, a yoke secured to said base plate, a brake shaft journaled in said plate and yoke, a gear wheel mounted on said shaft adapted to rotate therewith, a winding drum mounted to rotate on said shaft, means between said gear wheel and drum for transmitting rotary motion from said wheel to said drum and a pawl adapted to engage said drum.

3. In a hand brake mechanism, a base plate, a projection on said base plate, a pinion rotatably mounted on said projection, a brake shaft extending through said base plate, a gear wheel mounted on said shaft adapted to rotate therewith and engaged with said pinion, a winding drum mounted to rotate on said shaft, said drum having a hollow portion adapted to inclose said gear and pinion and adapted to engage with said pinion.

4. In a hand brake mechanism, a rotatable brake shaft, a bearing for said shaft, a gear wheel mounted on said shaft to rotate therewith, a winding drum mounted to rotate on said shaft, a projection extending within said drum and separate therefrom, and a pinion rotatably mounted on said projection adapted to engage said gear wheel and drum, said gear and pinion being held in operative position by said drum.

5. In a hand brake mechanism, a rotatable brake shaft, a winding drum rotatably mounted on said shaft, gear and pinion means between said shaft and drum for transmitting motion from said shaft to said drum, and a yoke adapted to hold said drum in operative position and form a bearing for said shaft, said drum being adapted to hold said shaft and pinion in operative position.

6. In a hand brake mechanism for railway cars, a plate attached to said car, a yoke attached to said car, a one piece brake shaft journaled in said plate and yoke, a winding drum mounted to rotate on said shaft, and means between said shaft and drum for transmitting rotary motion from said shaft to said drum, said drum and shaft being held in operative positions by said plate and yoke without the use of other securing means.

7. In a hand brake mechanism for railway cars, a plate secured to said car, a yoke secured to said plate, a brake shaft journaled in said yoke and plate, a winding drum mounted between said yoke and plate to rotate on said shaft, an enlarged portion on said shaft adapted to engage with said plate and drum to prevent longitudinal movement of said shaft, and means between said shaft and drum for transmitting rotary motion from said shaft to said drum.

8. In a hand brake mechanism, a base plate, a yoke secured to said base plate, a brake shaft journaled in said plate and yoke, a drum rotatably mounted on said shaft, means between said shaft and drum for rotating said drum, and an enlarged portion of said shaft adapted to engage with said plate and drum to prevent longitudinal movement of said shaft.

9. In a hand brake mechanism a base plate, a yoke secured to said base plate, a brake shaft journaled in said plate and yoke, said shaft having an enlarged portion intermediate its ends, a toothed wheel mounted on said enlarged portion adapted to rotate with said shaft, a chain winding drum mounted between said plate and yoke to rotate on said shaft, a pinion mounted on said plate and arranged to transmit rotary motion from said toothed wheel to said drum, said drum having portions extending over the enlarged portions of said shaft, pinion and toothed wheel to prevent longitudinal movement of said shaft, toothed wheel and pinion in one direction, said parts being held against movement in the opposite direction by their engagement with said base plate.

In testimony whereof I affix my signature in the presence of two witnesses.

ALFRED K. PEHRSON.

Witnesses:
FRANK E. MILLER,
HERBERT M. BENDER.